US009868168B2

(12) United States Patent
Stadtfeld

(10) Patent No.: US 9,868,168 B2
(45) Date of Patent: Jan. 16, 2018

(54) CUTTER WITH POSITIVE SEATED STICK BLADES FOR BEVEL GEAR CUTTING

(71) Applicant: THE GLEASON WORKS, Rochester, NY (US)

(72) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 152 days.

(21) Appl. No.: 14/782,102

(22) PCT Filed: Apr. 24, 2014

(86) PCT No.: PCT/US2014/035246
§ 371 (c)(1),
(2) Date: Oct. 2, 2015

(87) PCT Pub. No.: WO2014/176397
PCT Pub. Date: Oct. 30, 2014

(65) Prior Publication Data
US 2016/0039023 A1    Feb. 11, 2016

Related U.S. Application Data

(60) Provisional application No. 61/815,852, filed on Apr. 25, 2013.

(51) Int. Cl.
*B23F 21/22*    (2006.01)
*B26D 1/12*    (2006.01)

(52) U.S. Cl.
CPC .......... *B23F 21/223* (2013.01); *B23F 21/226* (2013.01); *B26D 1/12* (2013.01);
(Continued)

(58) Field of Classification Search
CPC .... B23F 21/223; B23F 21/226; B23F 21/126; B23F 21/128; B23F 21/22;
(Continued)

(56) References Cited

U.S. PATENT DOCUMENTS 4,078,868 A * 3/1978 Erkfritz ................. B23C 5/2208
407/104
4,093,391 A    6/1978 Bachmann et al.
(Continued)

FOREIGN PATENT DOCUMENTS

| JP | 2006-075974 A | 3/2006 |
| JP | 2008-229808 A | 10/2008 |
| JP | 2009-178792 A | 8/2009 |

OTHER PUBLICATIONS

JP 2008-229808 Machine Translation, pp. 5-9, Apr. 24, 2017.*
Patent Abstracts of Japan, JP 2009-178792 published Aug. 13, 2009, Ebisuya Kogu Seisakusho, JPO & INPIT, 2009, 1 pg.
Patent Abstracts of Japan, JP 2008-229808 published Oct. 2, 2008, Isuzu Motors, JPO & INPIT, 2009, 1 pg.
Patent Abstracts of Japan, JP 2006-075974 published Mar. 23, 2006, Ebisuya Kogu Seisakusho, JPO & NCIPI, 2006, 1 pg.
International Search Report and Written Opinion for PCT/US2014/035246, ISA/EPO, dated Jan. 5, 2015, 12 pgs.

*Primary Examiner* — Daniel Howell
*Assistant Examiner* — Nicole N Ramos
(74) *Attorney, Agent, or Firm* — Robert L. McDowell

(57) ABSTRACT

A bevel gear manufacturing face cutter head (2) for face hobbing and face milling wherein the face cutter head includes a positive blade seating and stick-type rectangular or square cross-section cutting blades (6) are clamped tight to the positive seating surfaces (14, 18). The cutting blades are adjustable radially by axial movement by a non-self-locking system.

17 Claims, 6 Drawing Sheets

(52) U.S. Cl.
CPC ........ *Y10T 407/17* (2015.01); *Y10T 407/1705* (2015.01); *Y10T 409/101431* (2015.01)

(58) Field of Classification Search
CPC ........... Y10T 407/1705; Y10T 407/171; Y10T 407/1715; Y10T 407/1725; Y10T 407/1735; Y10T 407/174; Y10T 407/1745; Y10T 409/101431; Y10T 409/10159; Y10T 409/101749; Y10T 409/101908; Y10T 409/104134; Y10T 409/105247; Y10T 409/105406; Y10T 409/106042; Y10T 409/106678; Y10T 409/106837; Y10T 409/106996; Y10T 409/107155; Y10T 409/107314
See application file for complete search history.

(56) References Cited

U.S. PATENT DOCUMENTS

| | | | | |
|---|---|---|---|---|
| 4,329,091 A * | 5/1982 | Erkfritz | ................ | B23C 5/2441 407/108 |
| 4,530,623 A * | 7/1985 | Kotthaus | ................ | B23F 21/226 407/22 |
| 6,609,858 B1 * | 8/2003 | Francis | ................ | B23F 21/226 407/113 |
| 2003/0044246 A1 * | 3/2003 | Erickson | ................ | B23F 21/226 407/21 |
| 2011/0164931 A1 | 7/2011 | Ono | | |

* cited by examiner

CUTTER WITH POSITIVE SEATED STICK BLADES FOR BEVEL GEAR CUTTING

FIELD OF THE INVENTION

The present invention is directed to cutting tools for gears and in particular to face cutters having a cutter head with stick-type cutting blades and means to clamp the cutting blades in the cutter heads.

BACKGROUND OF THE INVENTION

Bevel and hypoid gears can be cut in a single indexing process (face milling) or in a continuous indexing process (face hobbing). A basic cutting setup in the generating or cradle plane will put the center of the cutter head in a position which is away from the generating gear center (cradle axis) by the amount of the so-called radial distance. The silhouette of the cutter blades represents one tooth of the generating gear while the cutter rotates). Common face cutters for bevel gear cutting have several blade groups with each group having between one and four blades. Most common types of face cutters are alternating (completing) cutters with one outside and one inside blade.

In most stick blade cutter systems, the cutting blades have a rectangular blade cross section are usually secured in a cutter head via a friction seating between clamp blocks or clamp screws and a radial seating surface of the cutter head. An example of positive blade seating is shown in U.S. Pat. No. 6,120,217 which incorporates a pentagon shaped cross section with two specially oriented seating surfaces. It is very important for cutting blade (especially if the blade material is carbide) to achieve a stiff and precise seating between the blades and the cutter head. One purpose of a clamping system is the precise positioning and a high seating stiffness of cutting blades without any blade movements during a tool life run which, for example, may be more than 8 hours of continuous gear cutting.

There are some known types of cutter systems with positive blade seating which have found limited industrial utilization. Included in these cutter systems are those utilizing blades with circular or half circle shaped cross sections (for example, U.S. Pat. No. 5,934,841 and EP 1240966 A2). Tapered wedge clamp combinations are used in those systems to press the cylindrical blade sticks into round holes oriented around the circumference of the cutter head body. US 2011/0164931 uses a complex differential tandem wedge to clamp blades with a rectangular cross section into the corner of a rectangular cutter head slot. In the above cases, round or rectangular, the blades are wedged into the seating surfaces with self-locking clamp components. Truing requires tapping with a hammer in order to release the wedges and free the blades for axial movement. Precise cutter head building requires the ability to relieve the clamping forces of the clamping system without disturbing the axial blade location in order to move the blades axially by small amounts relative to their previous position. Such a truing procedure is not possible with self-locking systems wherein impacts from a tool, such as a hammer or screwdriver for example, are required before a blade can be axially moved.

SUMMARY OF THE INVENTION

The present invention is directed to a bevel gear manufacturing face cutter head for face hobbing and face milling wherein the face cutter head includes a positive blade seating and stick-type rectangular or square cross-section cutting blades are clamped tight to the positive seating surfaces. The cutting blades are adjustable radially by axial movement by a non-self-locking system.

DETAILED DESCRIPTION OF THE PREFERRED EMBODIMENT

Figures 1A, 1B:
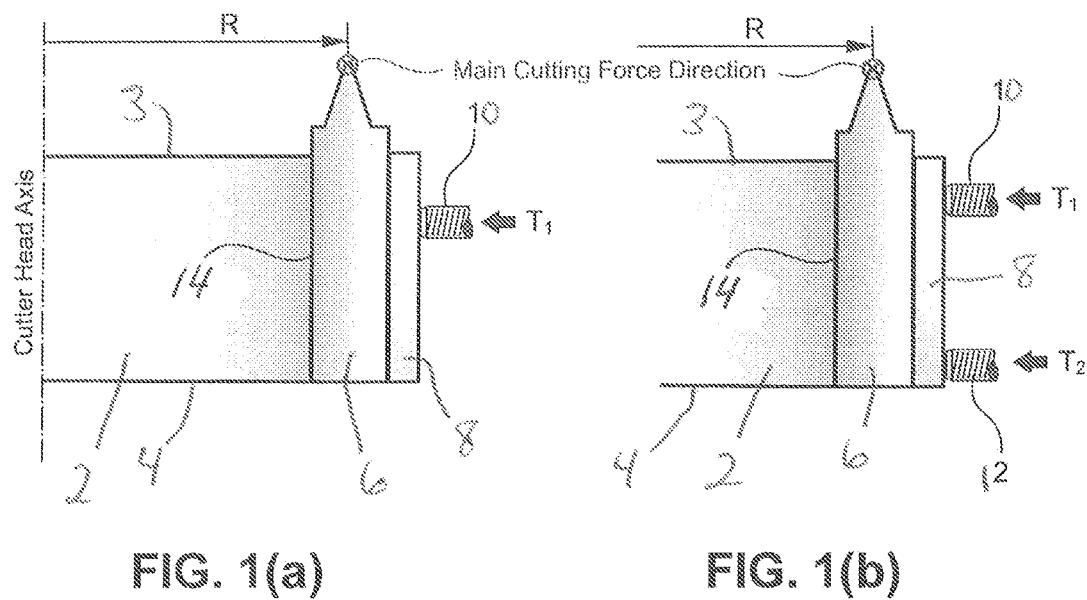
FIG. 1(a) shows a cross section of a cutter head with a stick blade which is connected to the cutter head with a clamp block and one clamp screw.
FIG. 1(b) shows a similar cross section but with the clamp block pressed against the blade with two clamp screws.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

FIG. 1(a) shows a cross sectional view of a cutter head 2 having a top surface 3, a bottom surface 4 and a blade positioning slot 5 (see FIG. 2) and further including a stick blade 6 which is positioned and held in the cutter head 2 with a clamp block 8 and one clamp screw 10 or an equivalent means to exert a force on clamp block 8. The blade 6 is pressed against the radial seating surface 14. The main cutting force is perpendicular to the clamp force. The friction between the seating surface 14 and the blade 6 should prevent the blade from moving perpendicular the drawing plane. Due to the intermitted cutting forces and tolerances on the flatness of the contacting surfaces of cutter head 2 and blade 6, an initial blade movement can occur. Such a movement slides the blade 6 perpendicular to the drawing plane until the back side of the blade contacts the back side of the slot 5.

FIG. 1(b) shows a similar cross section of a cutter head 2 with a rectangular stick blade 6. In this drawing the clamp block 8 is pressed against the blade 6 with two clamp screws 10, 12.

Figure 2:
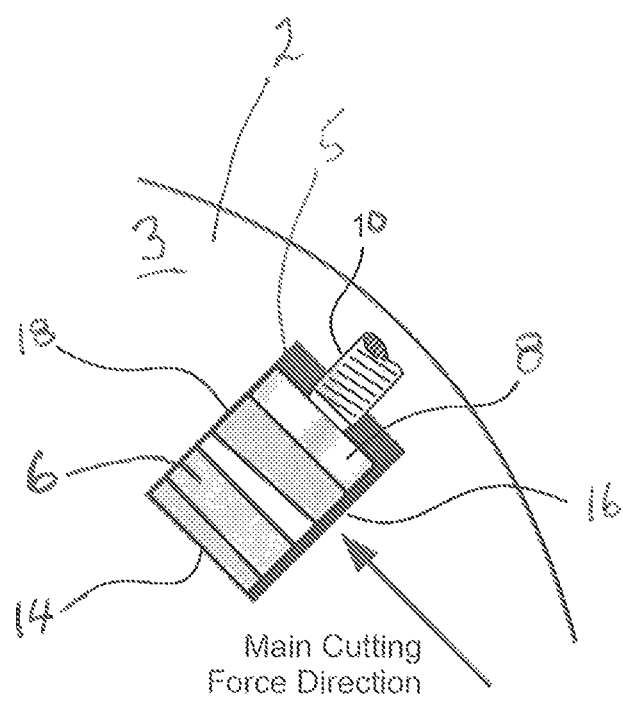
FIG. 2 shows to top view onto a section of a cutter head. The stick blade is pressed from a single screw and a clamp block onto the radial seating surface

FIG. 2 shows to top view onto a section of a cutter head 2. The stick blade 6 is pressed from a single screw 10 and a clamp block 8 onto the radial seating surface 14. A gap 16 which is required in order to allow the placing of a blade 6 in the slot 5 is shown in front of the blade 6. As a result of cutting, the gap will be partially in the front of the blade and partially between the back of the blade and the tangential seating surface 18. It is very likely the gap will exist in the front of the blade at the top of the cutter and in the back of the blade at the bottom of the cutter. Between the top and bottom of the cutter, the gap will be partially in the front and partially in the back of the cutting blade 6. This type of seating principle is known as "friction seating" since no clamp force component exists which would press the blade 6 against the tangential seating surface 18. The tangential seating surface 18 is therefore not a qualified seating surface. Dynamic cutting forces can change the split of gap components between front and back continuously during the cutting process.

Figure 3:
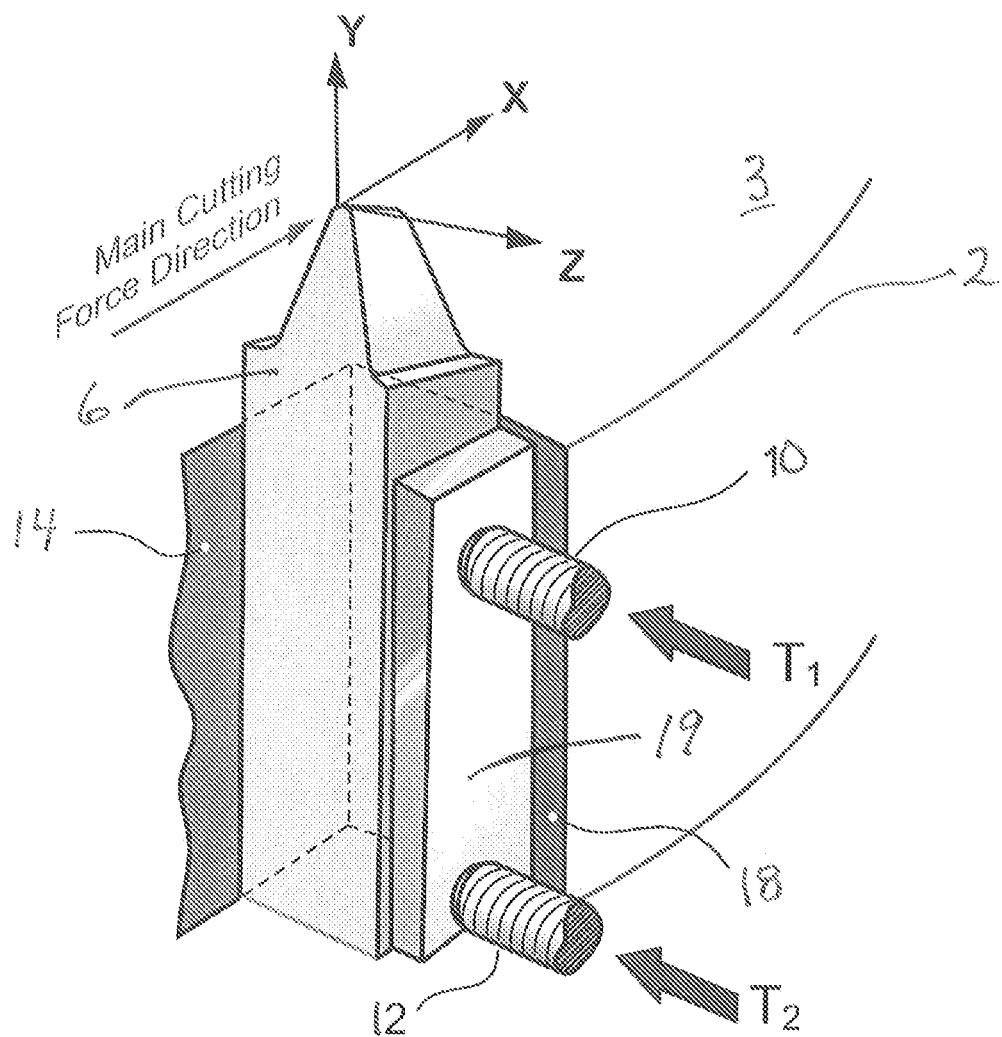
FIG. 3 shows a three dimensional view of a cutter head section with a rectangular stick blade pressed with two clamp screws and a clamp block onto the radial seating surface. The connection between blade and cutter head is a friction seating.

FIG. 3 shows a three dimensional view of a cutter head section with a rectangular stick blade 6 pressed with two clamp screws 10, 12 and a clamp block 19 onto the radial seating surface 14. The connection between blade 6 and cutter head 2 is a friction seating. The main cutting force direction is perpendicular to the clamping force. Only the friction between radial seating surface 14 and blade 6 prevent the blade from a tangential movement.

The inventor has developed a bevel gear cutter head having stick-type cutting blades with a rectangular or square cross section and a blade clamping mechanism which provides a stiff positive seating of the stick blades in the cutter head slots of both face milling and face hobbing cutters.

Figure 4:
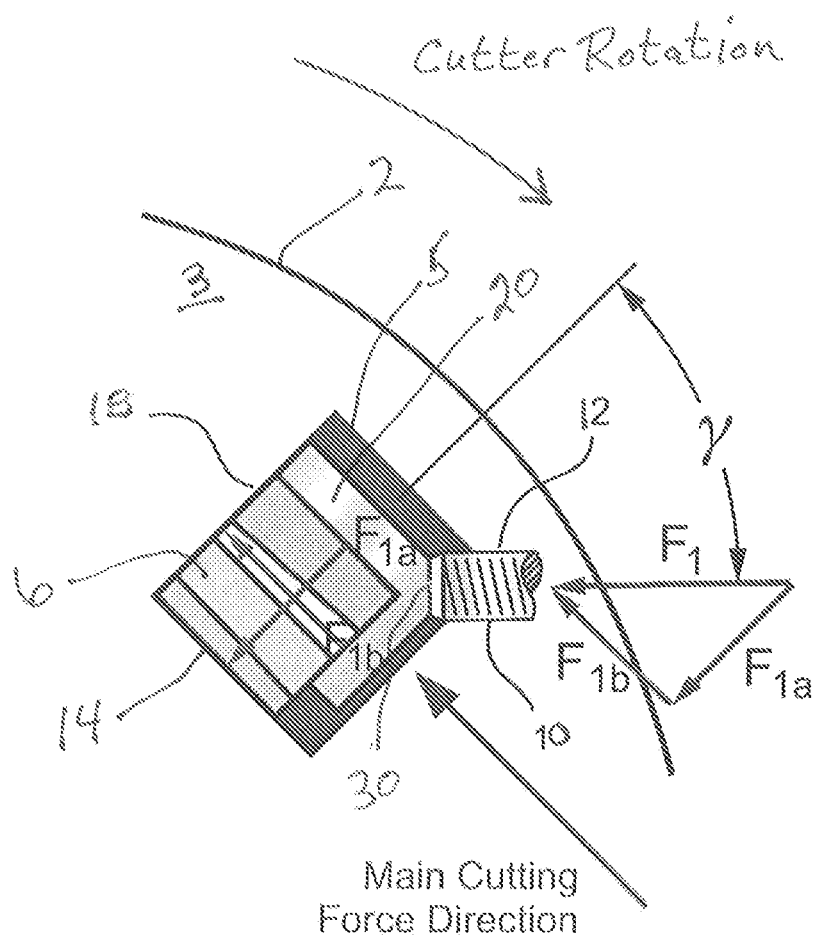
FIG. 4 shows a top view onto a cutter head section with one rectangular slot. The stick blade in the slot is pressed by two corner screws and an angular clamp block against the tangential and radial seating surfaces.

FIG. 4 shows a top view onto a face milling cutter head section with one rectangular slot 5 illustrated. The stick blade 6 in the slot is pressed by two corner screws 10, 12 and an "L-shaped" angular clamp block 20 against at least a portion of both the tangential seating surface 18 and the radial seating surface 14. The radial seating surface 14 provides a precise and stiff radial positioning of the blade 6 while the tangential seating surface 18 backs the blade up against the main cutting force with a high contact stiffness.

The clamp screw 10 is oriented under an angle γ (with respect to a reference line perpendicular to radial seating surface 14) on the front outside corner of the cutting blade, its force $F_1$ acts with the $F_{1a}$ component radially and with the $F_{1b}$ component tangentially as shown in FIG. 4. The force $F_2$ of a similarly positioned lower second clamp screw 12 acts also with the $F_{1a}$ component radially and with the $F_{2b}$ component tangentially (not shown in FIG. 4). The seating principle is a positive seating or form seating.

Figure 5:
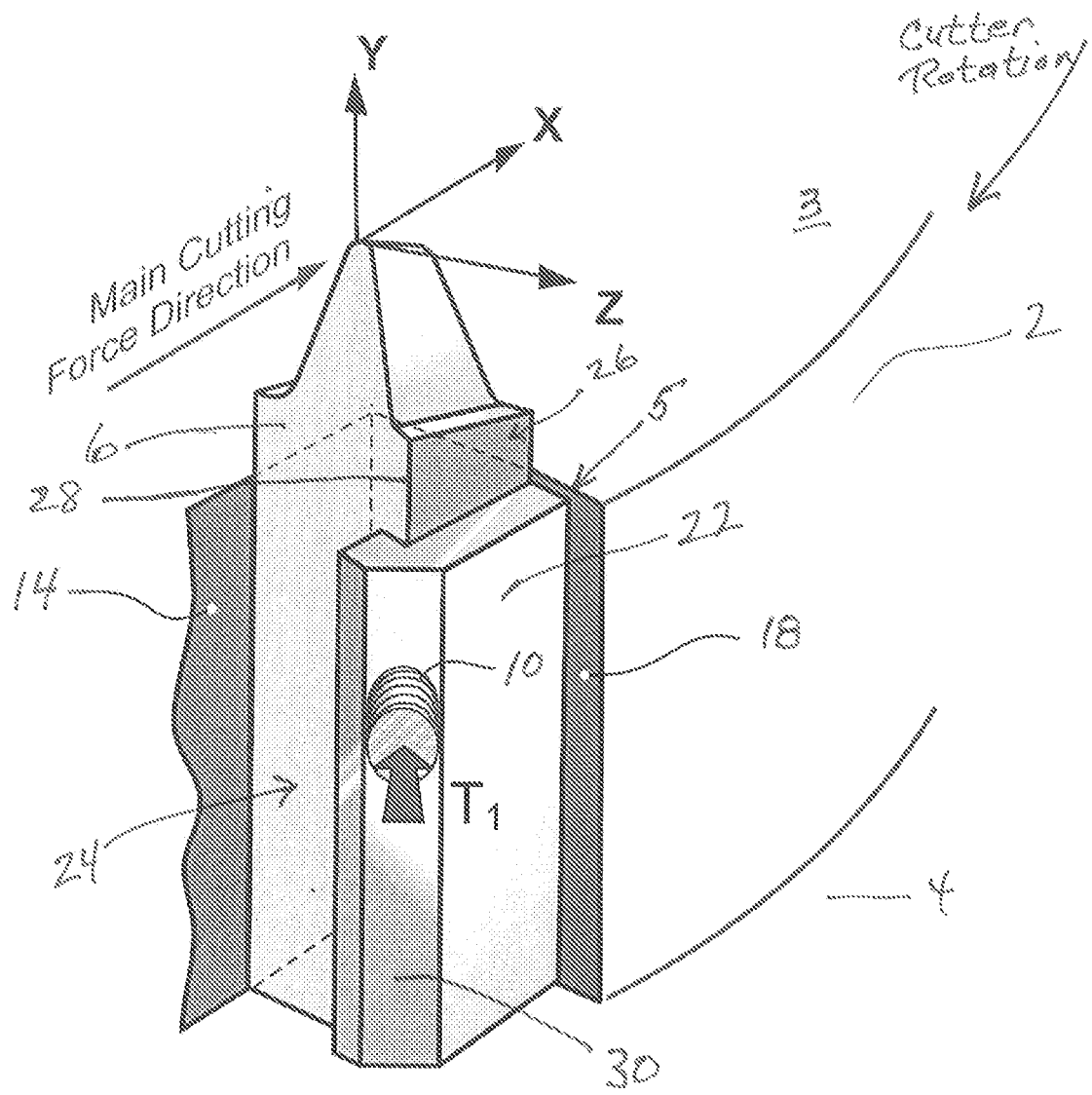
FIG. 5 shows a three dimensional view of a cutter head section with one blade slot. The rectangular blade is pressed with one corner screw and an angular clamp block against the tangential and the radial seating surfaces.

FIG. 5 shows a three dimensional view of a cutter head section with one blade slot 5 illustrated. The rectangular blade 6 is pressed with one corner screw 10 and an L-shaped angular clamp block 22 against at least a portion of both the tangential seating surface 18 and the radial seating surface 14. The stiff tangential seating provides high blade stiffness in the cutting process and prevents blade vibrations. The stiff radial seating provides a precise blade location and also prevents blade movement and vibrations during the gear cutting process.

Figure 6:
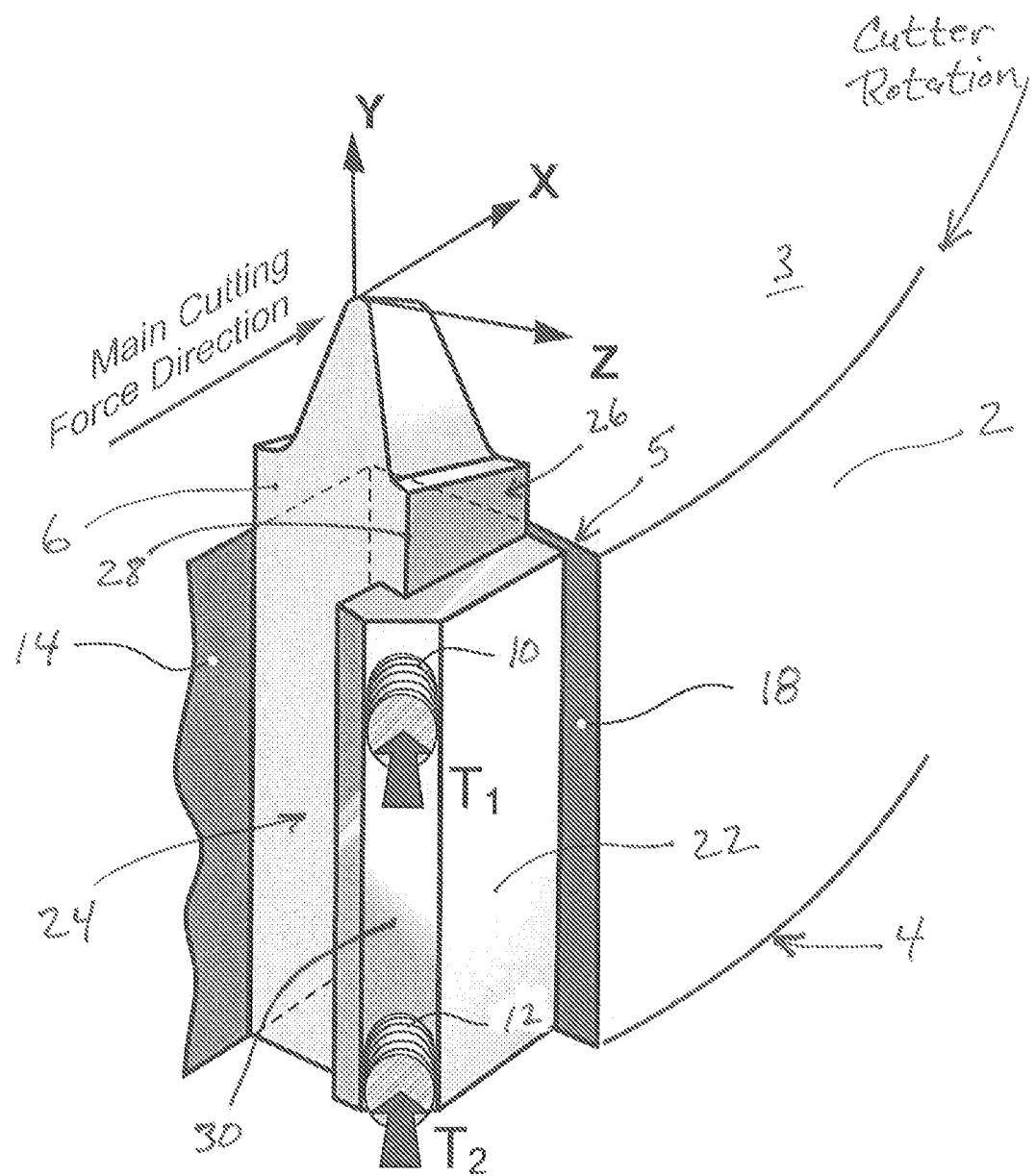
FIG. 6 shows a three dimensional view of a cutter head section with one blade slot. The rectangular blade is pressed with two corner screws and an angular clamp block against the tangential and the radial seating surfaces.

FIG. 6 shows a three dimensional view of a cutter head section with one blade slot 5 illustrated. The rectangular blade 6 is pressed with two corner screws 10, 12 and an angular clamp block 22 against the tangential seating surface 18 and the radial seating surface 14. Depending on the design of the clamp block 22 and the clamping length of the blade 6, it can be an advantage to use a second clamp screw. In such a case, the upper clamp screw 10 may be located with some distance to the upper face 3 of the cutter head 2 and the lower clamp screw 12 might be located at the lowest possible point relative to the clamp block 22.

The inventive cutter head uses stick blades with square or rectangular blade cross section. With respect to the direction of cutter rotation, the clamp block 22 preferably contacts at least a portion of the front surface 24, at least a portion of the outside surface 26 and the blade corner 28 defined by the intersection of the front and outside surfaces (as defined by a cutting blade positioned in a cutter head illustrated by FIGS. 4-6). The clamp block 22 extends longitudinally by a distance not exceeding the length of the slot 5 between the top surface 3 and the bottom surface 4. One or more clamp screws 10, 12 are positioned to contact the corner area, preferably a flat area 30, of the clamp block 22 and are oriented under an appropriate angle γ (e.g. 45°) to the reference line perpendicular to radial seating surface 14 (see FIG. 4). The radial clamp force $F_{1a}$ component presses the stick blade 6 against the radial seating surface 14 and provides precise positioning as well as radial seating stiffness. The tangential force component $F_{1b}$ presses the stick blade 6 against the tangential seating surface 18 and provides a defined position and a stiff seating of the blade in tangential direction. The main cutting force direction finds a reaction force coming from the tangential seating surface without tangential blade movement and dynamic disturbances. The inventive seating arrangement provides a positive blade seating between square or rectangular stick blades and a cutter head.

As can be seen in FIGS. 4-6, when a cutting blade 6 is positioned in a blade positioning slot 5 of a cutter head 2, three of the blade corners are located next to one or both of the radial seating surface 14 and the tangential seating surface 18. The fourth blade corner 28, defined by the intersection of the blade front surface 24 and the outside surface 28 (with respect to the direction of cutter rotation) is therefore defined as the front outside corner and is located remote from both the radial seating surface 14 and the tangential seating surface 18. A clamping force, $F_1$, oriented at an angle γ to the reference line of the slot 5, is applied by one or more clamping screws (e.g. 10 and/or 12), preferably via a clamp block 20, 22, which applies the clamping force to the front outside (i.e. remote) corner 28. Alternatively, the clamping force may be applied to an area of the blade front surface 24 and/or the outside surface 28 located near to the corner 28 (i.e. the "remote corner region") of the cutting blade.

The clamp screw angle $\gamma$ may be lower than 45° in order to have high radial seating contact force and generate, in the tangential direction, just enough force to get a defined and stiff seating on the tangential seating surface 18. The main cutting force vector $F_1$ will deliver an additional force against the tangential seating surface 18 in the upper area. The main cutting force will also try to separate the tangential seating surface 18 in the lower area of the slot 5. The tangential pressure component (from one or more clamp screws) in the lower area acts to prevent the surface separation in this area. In case of two clamp screws (e.g. 10, 12), it is also possible to use a lower torque on the top clamp screw 10 and a higher torque on the lower clamp screw 12 or vice versa.

Controlling different radial and tangential force components of the upper and lower clamp screw may be accomplished by the use of different angular orientations of the upper and lower clamp screws 10, 12. For example, the upper clamp screw 10 may have a more radial orientation (e.g. $\gamma_1=30°$) and the lower clamp screw 12 may have a more tangential orientation (e.g. $\gamma_2=60°$). In case of a chosen angle $\gamma$, the force components of $F_1$ which act onto the two seating surfaces 14, 18 are:

$$F_{1a}=F_1 \cos \gamma_1$$

$$F_{1b}=F_1 \sin \gamma_1$$

$$F_{2a}=F_2 \cos \gamma_2$$

$$F_{2b}=F_2 \sin \gamma_2$$

The illustration in FIG. 4 indicates $\gamma=\gamma_1=\gamma_2$

In FIG. 4 only the upper clamp screw 10 is visible. Clamp screw 12 (Force=$F_2$, clamp screw angle=$\gamma_2$) is located below the upper clamp screw 10 and is hidden in the view of FIG. 4.

For ease of understanding and explanation of the invention, the Y-axis of the coordinate system in FIGS. 5 and 6 has been chosen parallel to the cutter head axis of rotation and the extension of the Z-axis to the left (negative direction) intersects with the cutter head axis of rotation. The theoretical blade front is oriented in the plane which is defined by the Y and Z axes. Although stick blades in actual cutter heads are commonly inclined with their length direction versus the Y-axis and have an offset with their theoretical front face versus the Z-axis, the principle function of the adjustment will not change and the resulting blade tip position and angle changes will only differ in the single percent range if actually realized cutter head designs are considered.

The inventive clamping system is also applicable to those cutters which do not utilize clamp blocks. The clamp screws of those cutters types usually include a provision for a rotating tip (e.g. swivel head) or blades with a flat area perpendicular to the clamp screw axis in order to provide a surface for defined and stable contact between the tip of a clamp screw and a stick blade.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

The invention claimed is:

1. A cutter head for a gear cutting tool, said cutter head comprising:
   an axis of rotation,
   a first side and a second side spaced axially from one another,
   at least one rectangular cutting blade mounting and positioning slot arranged in said cutter head and having a length extending from said first side to said second side, said at least one slot comprising a radial seating surface for providing precise and stiff radial positioning of the blade and a tangential seating surface for backing the blade up against the main cutting force, said radial and tangential seating surfaces being arranged perpendicular to one another,
   a clamping mechanism located in said at least one slot, said clamping mechanism being capable of delivering a clamping force to a corner region of a cutting blade, having a square or rectangular cross-section, mounted in said at least one slot, said corner region being remote from said radial seating surface and said tangential seating surface of said at least one slot,
   whereby a first portion of the clamping force is directed to and effects a clamping of the cutting blade against said radial seating surface and a second portion of the clamping force is directed to and effects a clamping of the cutting blade against said tangential seating surface, and wherein the cutting blade is adjustable radially by axial movement by a non-self-locking system.

2. The cutter head of claim 1 further comprising an angular clamping block having a shape complementary to said corner region of the cutting blade.

3. The cutter head of claim 1 further comprising at least one clamping screw at each of said at least one slot, said at least one clamping screw positioned to deliver the clamping force to said corner region.

4. The cutter head of claim 2 further comprising at least one clamping screw at each of said at least one slot, said at least one clamping screw positioned to deliver the clamping force to said clamping block.

5. The cutter head of claim 4 wherein said at least one clamping screw is positioned to deliver the clamping force to said corner region.

6. The cutter head of claim 4 wherein said at least one clamp screw is oriented at an angle $\gamma$ with respect to a reference line extending perpendicular to said radial seating surface.

7. The cutter head of claim 6 comprising two clamp screws arranged between the first and second sides of said cutter head at each of said at least one slot wherein each of said clamp screws is oriented at the same angle $\gamma$.

8. The cutter head of claim 6 comprising two clamp screws arranged between the first and second sides of said cutter head at each of said at least one slot wherein each of said clamp screws is oriented at a different angle $\gamma$.

9. The cutter head of claim 2 wherein said clamping block includes a flat contact surface at an outer corner area thereof.

10. A gear cutting tool comprising:
    a cutter head having an axis of rotation, a first side and a second side spaced axially from one another, at least one rectangular cutting blade mounting and positioning slot arranged in said cutter head and having a length extending from said first side to said second side, said at least one slot comprising a radial seating surface for providing precise and stiff radial positioning of the blade and a tangential seating surface for backing the blade up against the main cutting force, said radial and tangential seating surfaces being arranged perpendicular to one another, an angular clamp block located in said at least one slot, a cutting blade having a square or rectangular cross-section positioned in said at least one slot, said clamp block contacting a corner region of said cutting blade, said corner region being remote from said radial seating surface and said tangential seating surface of said at least one slot, at least one clamp screw positioned in said cutter head at each of said at least one slot, said at least one clamp screw exerting a clamping force against said clamp block and said cutting blade, whereby a first portion of the clamping force is directed to and effects a clamping of the cutting blade against said radial seating surface and a second portion of the clamping force is directed to and effects a clamping of the cutting blade against said tangential seating surface, and wherein the cutting blade is adjustable radially by axial movement by a non-self-locking system.

11. The cutting tool of claim 10 wherein said at least one clamp screw is positioned to exert a clamping force at said corner region of said cutting blade.

12. The cutting tool of claim 10 wherein said at least one clamp screw is oriented at an angle γ with respect to a reference line extending perpendicular to said radial seating surface.

13. The cutting tool of claim 10 comprising two clamp screws arranged between the first and second sides of said cutter head at each of said at least one slot wherein each of said clamp screws is oriented at a same angle γ.

14. The cutting tool of claim 10 comprising two clamp screws arranged between the first and second sides of said cutter head at each of said at least one slot wherein each of said clamp screws is oriented at a different angle γ.

15. The cutting tool of claim 10 wherein said clamp block includes a flat contact surface at an outer corner area thereof for contact by said at last one clamp screw.

16. The cutting tool of claim 10 comprising more than one clamp screw at each of said at least one slot wherein each of said more than one clamp screw exerts the same clamping force on said cutting blade.

17. The cutting tool of claim 10 comprising more than one clamp screw at each of said at least one slot wherein each of said more than one clamp screw exerts a different clamping force on said cutting blade.

* * * * *